United States Patent Office 3,193,399
Patented July 6, 1965

3,193,399
SILICONOXYNITRIDE BONDED SILICON CARBIDE ARTICLE AND METHOD
Malcolm E. Washburn, Northboro, Mass., assignor to Norton Company, Worcester, Mass., a corporation of Massachusetts
No Drawing. Filed July 28, 1960, Ser. No. 45,800
13 Claims. (Cl. 106—44)

This application is a continuation-in-part of application Serial No. 837,605, filed September 2, 1959, and now abandoned.

The invention relates to complex silicon carbide compositions and processes of making them.

One object of the invention is to provide better refractories out of which to make cell linings for aluminum extraction by the Hall process. Another object of the invention is to make refractories resistant to attack by molten cryolite, which is the salt used in Hall process cells. Another object of the invention is to produce refractories which are more resistant to chemical attack at high temperatures than previous silicon carbide refractories.

Another object of the invention is to improve the operation of Hall process aluminum cells. Another object of the invention is to produce superior refractories to line such cells at low cost. Another object of the invention is to produce a refractory more resistant to attack by molten cryolite than conventional silicon carbide products and which is less costly than present silicon nitride bonded silicon carbide products.

Another object of the invention is to provide a process for making refractories out of silicon carbide having a modified silicon nitride bond or a bond which includes combined silicon and nitrogen and which is less expensive than previous processes as it is developed without the use of controlled nitrogen atmosphere, that is to say the products can be fired in ordinary air or in the atmosphere of a typical fuel fired kiln. Another object is to produce refractories having a lower electrical conductivity than those made with present silicon nitride bond, especially such products made with silicon carbide refractory grain.

Another object of the invention is to provide a raw batch for the process of manufacturing bricks, slabs and other refractories in which the firing involves no special atmosphere and therefore no extra cost. Another object is to make low cost refractories which are nevertheless quite superior for use not only in Hall process cells but also as kiln furniture.

Other objects will be in part obvious or in part pointed out hereinafter.

The aluminum industry is currently (1959) investigating electrolytic cell linings made of dense conventional type oxide-bonded silicon carbide products. These silicon carbide refractories possess high heat conductivity which makes it possible to operate the cell with a frozen layer of cryolite for protection against molten cryolite attack. These conventional oxide bonded refractories, when allowed to come in contact with molten cryolite, deteriorate. This causes difficulty in that little protection is offered at hot spots in the cell where molten cryolite is in contact with the refractory. Silicon nitride bonded silicon carbide has excellent resistance in this application but is costly.

I have discovered that if a silicon carbide refractory body is prepared by molding a mixture of silicon carbide, elemental silicon, and a cyanamide compound and firing the molded shape in air or air containing products of gaseous combustion, the resulting refractory body has surprisingly better resistance to attack by molten cryolite than conventional dense oxide-bonded silicon carbide products.

The bond of my product contains compounds of silicon and nitrogen as a result of chemical reactions involving a powdered silicon constituent of the bond mixture and a nitrogenous bond constituent. As nitrogenous constituent I prefer to use calcium cyanamide, but I have also used dicyandiamide with success, and other cyanamide compounds can be employed.

In a typical bond mixture for the practice of my invention, I may take 8 parts by weight of finely divided commercial silicon powder and 2 parts by weight of powdered calcium cyanamide. After preliminary blending of these constituents, I add them, for example to around 100 parts by weight of silicon carbide grain of sizing designed to give high density products. The principles of sizing such grain are well known to those skilled in the art. With these dry constituents in a mixing machine I may add about one part by weight of dextrine, or other organic temporary binder, to aid in obtaining green strength in the product, and, indeed, a small amount of a plasticizing ingredient, such as 2 parts by weight of powdered bentonite, may also be added for further improved workability and green strength, if desired.

I then start the mixing machine and add sufficient water to moisten the mixture, which may be of the order of 5 parts of water by weight. After mixing for a few minutes, the batch is ready for molding by pressing, tamping or other compacting methods.

I mold the shape desired such as bricks, plates, slabs, cylinders, etc. The shapes are then dried to remove the water put in the mix for molding. I find that I can fire the shapes satisfactorily in several types of kilns. I have used electric kilns heated by silicon carbide heating elements and also fuel-fired periodic and tunnel kilns, with no special control of the atmosphere for this product. I find that it is best to fire the product high enough so that the silicon will nitride readily, the optimum reaction temperature being about 1400° C., but temperatures as low as 1200° C. have been used satisfactorily. Higher temperatures can also be used.

Since an important object of this invention is to produce a refractory which is more resistant to attack by molten cryolite than the conventional type of oxide-bonded silicon carbide product and is cheaper than regular silicon nitride bonded silicon carbide products, I set up tests to study the rate of attack by molten cryolite on different silicon carbide refractories. In the course of this testing, I discovered that a silicon carbide refractory body made in accordance with my invention has suprisingly better resistance to attack by molten cryolite than conventional dense oxide-bonded silicon carbide products. In the test work such conventional silicon carbide products were represented by specimens made in accordance with U.S. Patent No. 2,118,789 to Fisher, and other conventional silicon carbide refractories have also been tested with similar results.

Examples of my invention will now be given:

EXAMPLE I

Two rectangular refractory bars measuring approximately 4½″ x 1″ x 1″ were prepared from the following composition:

| | Parts by wt. |
|---|---|
| Silicon carbide, gray variety | 90.5 |
| Elemental silicon | 7.5 |
| Pulverized calcium cyanamide | 2.0 |
| Dextrine | 1.0 |
| Water | 5.0 |
| Total | 106.0 |

The silicon carbide employed was milled to pass through a 10 mesh screen. The elemental silicon was of sizing to pass a #150 screen.

About 450 grams of this mixture was made by hand methods, first mixing dry, then adding the water and blending together with a spatula until the mixture was fairly homogeneous. Then 210 grams were weighed out and placed in the 4½″ x 1″ x 1″ cavity of a rectangular steel pressing mold, placed in a hydraulic press after positioning the top mold plate, and then pressed to 3 tons per square inch with a total pressure of 13½ tons. The bar was stripped from the mold, then dried overnight in a circulating air oven at about 200° F.

Two bars were made in this manner. The green density was measured on one of the bars after drying out before firing and found to be 2.36 grams/cc. Both bars were fired at 1450° C. in an atmosphere of air in a small laboratory furnace heated by silicon carbide heating elements. The fired density of the previously measured bar was found to be 2.46 grams/cc. The surfaces of the bars were covered with a brown crystalline glaze. The modulus of rupture at room temperature of one bar was 4100 pounds per square inch, when broken by slow loading on a 3¾″ span.

The bar not broken in the modulus of rupture test was tested for resistance to attack by molten cryolite and molten aluminum metal at 1000° C. The test bath consisted of a molten bottom layer of aluminum alloy #7075 approximately 1″ in depth and a molten top layer of fluoride bath approximately 6″ in depth. Alloy #7075 is particularly corrosive with refractories and contains 0.5% Si, 0.7% Fe, 1.2–2.0% Cu, 0.30% Mn, 2.1–2.9% Mg, 0.2–0.4% Cr, 5.1–6.1% Zn, 0.15% others with the remainder aluminum. The fluoride bath used was typical of compositions employed in the reduction cells for electrolytic production of metallic aluminum from aluminum oxide and consisted of 88 wt. percent natural cryolite ($3NaF \cdot AlF_3$), 8 wt. percent $CaF_2$, and 4 wt. percent $Al_2O_3$. The test bath was contained in a silicon nitride bonded silicon carbide crucible. The crucible was surrounded by a refractory alumina sleeve with the annular space between filled with powdered alumina to soak up any bath that might soak through the crucible wall. The crucible assemblies were placed in a tub-type furnace heated by silicon carbide heating elements.

The bar to be tested was held by tongs and dropped into the bath on end where it remained for two hours. All bars tested sank in the cryolite-Al bath, so there was no difficulty in keeping them completely immersed. A similar bar of standard refractory silicon carbide dense commercial composition having an oxide bond of the general type described in Fisher Patent No. 2,118,789 was also immersed for comparison. After the two hour period of total immersion with one end of the bars resting in the aluminum metal layer, they were removed by grasping and withdrawing with tongs and placed on a refractory plate to cool in room air. The excess adhering solidified bath was scraped off as close to the silicon carbide surface as possible without disturbing the surface. The approximate bulk volume of the bar remaining was measured by a water displacement method after first covering the bar surface with a thin film of impervious wax which was accounted for in the calculation. This procedure was repeated for a number of cycles until significant differences in the rate of attack on the bar by the bath were found. After five cycles the bar of Example I lost 32% of its original volume whereas the corresponding comparative bar of standard composition lost 80%.

Table I shows the results on many silicon carbide refractory products obtained in the molten cryolite-aluminum bath test. Item #4 in Table I gives the test results in more detail for the above Example I bar. Comparative results on old art products are tabulated in items 15 through 19. A large number of additional tests have been run, including results on commercial old art products of other manufacturers, that show results similar to those of the old art products given in the table.

Table I.—Results on silicon carbide refractory products when tested in the molten cryolite-aluminum bath test

| Item No. | Example No. | Footnote | Bond* (Commercial ingredients) | | Percent total volume lost due to 2-hour test cycles after— | | | |
|---|---|---|---|---|---|---|---|---|
| | | | Percent Si | Percent Cyanamide | 3 cy. | 4 cy. | 5 cy. | 6 cy. |
| 1 | II | (¹) | 12 | 2 | 0 | 2 | 4 | 6 |
| 2 | | (¹) | 10 | 2 | 2 | 3 | 7 | 11 |
| 3 | | (¹) | 7.5 | 2 | 5 | 17 | 26 | 26 |
| 4 | I | (¹) | 7.5 | 2 | 3 | 7 | 32 | 36 |
| 5 | | (²) | 12 | 2 | 4 | 8 | 20 | 32 |
| 6 | | (²) | 10 | 2 | 8 | 9 | 17 | 22 |
| 7 | | (²) | 7.5 | 2 | 4 | 5 | 11 | 18 |
| 8 | | (²) | 12 | 5 | 5 | 21 | 34 | 55 |
| 9 | | (³) | 8 | 1 | 0 | 0 | 1 | 2 |
| 10 | | (⁴) | 8 | 1 | 6 | 13 | 22 | 34 |
| 11 | | (⁴) | 9 | ½ | 1 | 10 | 18 | 31 |
| 12A | III | (⁵) | 12 | 2 | 2 | 7 | 11 | 19 |
| 12B | III | (⁶) | 12 | 2 | 1 | 3 | 4 | 5 |
| 13 | IV | (¹) | 12 | 2 | 3 | 2 | 2 | 4 |
| 14 | V | (¹) | 12 | 2 | 4 | 5 | 5 | 6 |
| 15 | | (¹) | | Fisher patent. | 35 | 46 | 80 | |
| 16 | | (²) | | do | 92 | | | |
| 17 | | (³) | | do | 95 | | | |
| 18 | | (⁷) | | do | 22 | 60 | | |
| 19 | | (⁷ ⁸) | | Modified Fisher. | 38 | 100 | | |

* The ingredient composition is expressed as percentage of so-called "permanent constituents," with the exclusion of temporary binders and water. In Item Nos. 1 through 12B, the cyanamide is calcium cyanamide. For Items 13 and 14, it is dicyandiamide.
¹ The 4½″ bars were tested uncut and measured approximately 4½″ x 1″ x 1″.
² These brick sections were cut with a diamond wheel from 9″ x 4½″ x 2½″ bricks and were approximately 4½″ x 1″ x 1″ with three cut sides.
³ These brick sections were cut from 9″ x 4½″ x 2½″ bricks and were approximately 4½″ x 2½″ x 1″ with two cut sides.
⁴ These bricks sections were cut from 13½″ x 6″ x 2½″ bricks and were approximately 6″ x 2½″ x 1″, with two cut sides.
⁵ This slab section was cut from the surface of a 21″ x 13¾″ x 2½″ slab and was approximately 4″ x 1″ x ¾″ with two cut ends, three cut sides, and a 1″ wide uncut side.
⁶ This slab section was cut from the core of the same 21″ x 13¾″ x 2½″ slab and was approximately 4″ x 1″ x 1″ with two cut ends and four cut sides.
⁷ The bar sections were cut from 9″ x 2¼″ x ¾″ bars and were approximately 4½″ x 1″ x ¾″ with one cut end and one cut side.
⁸ The modified Fisher patent bond is one containing 1% bentonite and 0.5% whiting in the raw batch.

EXAMPLE II

Two 4½″ x 1″ x 1″ rectangular refractory bars were prepared from the following composition:

| | Parts by wt. |
|---|---|
| Silicon carbide | 86.0 |
| Elemental silicon | 12.0 |
| Pulverized calcium cyanamide | 2.0 |
| Dextrine | 1.0 |
| Water | 4.5 |
| Total | 105.5 |

The ingredients were the same as those described in Example I. Each bar was prepared from 210 grams of the mixture in a manner similar to that described in Example I. After drying overnight the "green" density was measured and found to be 2.37 grams/cc. and 2.36 grams/cc. They were fired in a small laboratory furnace heated by silicon carbide heating elements with a free rate of rise to 1400° C. with a five hour soaking period at 1400° C. The densities after firing were 2.45 grams/cc. and 2.42 grams/cc. The modulus of rupture at room temperature of one bar was 3200 p.s.i.

The surface of the bars was bluish gray covered with a glassy glaze. The interior as shown by a broken cross section showed a light gray core about ¾" x 1" in size. The bar not broken in the modulus of rupture test was tested for resistance to attack by molten cryolite and aluminum metal, by the test described in Example I. After six two-hour cycles the bar lost only 6% of its original volume. (See Item #1 in Table I.)

EXAMPLE III

A large refractory slab 21" x 13¾" x 2½" was prepared from the following composition:

| | Parts by wt. |
|---|---|
| Silicon carbide | 86.0 |
| Elemental silicon | 12.0 |
| Pulverized calcium cyanamide | 2.0 |
| Dextrine | 1.0 |
| Water | 4.5 |
| Total | 105.5 |

The ingredients were the same as those described in Example I. About 200 pounds of the mixture was prepared by blending the ingredients together in a large rotating pan with blades set vertically at angles so that the material is folded into itself and becomes thoroughly blended.

The slab was made by techniques used in commercial practice. A large steel mold cavity was filled with 68.54 pounds of the mixture. The mold was assembled and placed in a large hydraulic press where it was pressed at 1000 tons total pressure which is equivalent to 3½ tons per square inch on the mold plate. The slab was dried for two days and then fired in a gas fired tunnel kiln at cone 16.

The fired refractory slab had excellent surface quality with a fine crystalline glaze development and a fairly uniform brown color. The density was 2.56 grams/cc. Upon slicing the slab with a diamond wheel so that the 13¾ x 2½" cross section, six inches from the end was exposed, a light gray core development was observed. It was about one inch wide and 12½" long extending to within ⅝" of either end. This core was similar in appearance to silicon nitride bonded silicon carbide refractories prepared in a special nitrogen atmosphere furnace such as is now used commercially.

A specimen of the surface portion 4" x 1" x ¾" and a specimen of the core 4" x 1" x 1" were tested for resistance to attack by molten cryolite and molten aluminum at 1000° C. by the test described in Example I. After six two-hour cycles the surface portion lost 19% (Table I, Item 12A) of its original volume while the core lost only 5% (Table I, Item 12B) of its original volume. Comparison of the rate of attack for the specimen of this example and that of the standard oxide bonded composition shows that both the surface and the core of the large refractory slab described in Example III are much superior to the standard composition.

EXAMPLE IV

Two 4½" x 1" x 1" rectangular refractory bars were made from the following composition:

| | Parts by wt. |
|---|---|
| Silicon carbide | 84.0 |
| Elemental silicon | 12.0 |
| Dicyandiamide | 2.0 |
| Bentonite | 2.0 |
| Dextrine | 1.0 |
| Water | 4.5 |
| Total | 105.5 |

The silicon carbide and the elemental silicon were the same as described in Example I. The dicyandiamide was technical grade with crystals fine enough to pass through a 100 mesh screen.

The bars were prepared from 400 grams of the mixture in a manner similar to that described in Example I with 200 grams in each bar. The density of one dried "green" bar was 2.27 grams/cc.

The bars were placed with other similar specimens in a silicon carbide sagger approximately 15" x 10" x 4" with a cover resting on top so that the enclosed volume was reasonably confined and fired to 1450° C. with a four hour soak at 1450° C.

The previously measured fired bar had a density of 2.40 grams/cc. and was dark gray in color with light glassy spots. The other bar had a modulus of rupture of 3500 p.s.i. at room temperature. The broken cross section was light gray with many fractured silicon carbide grain faces resembling broken sections of the above described commercial silicon nitride bonded silicon carbide refractories.

A typical sample of the bar of this example was analyzed by an X-ray spectrograph test which showed the presence of two types of silicon nitride and another compound with peaks at d.=4.67 and d.=4.44, which may be reasonably speculated to be a silicon oxynitride compound or possibly even a silicon carbon nitride compound.

The unbroken bar was tested for resistance to molten cryolite and aluminum metal by the test described in Example I. After six two-hour cycles the bar lost only 4% of the original volume. Comparison of the rate of attack curves for the specimen of this example and that of the standard oxide bonded composition shows that the bar described in Example IV is much superior to the standard composition. (See Table I, Item #13.)

EXAMPLE V

Two 4½" x 1" x 1" rectangular refractory bars were made from the following composition:

| | Parts by wt. |
|---|---|
| Silicon carbide | 86.0 |
| Elemental silicon | 12.0 |
| Dicyandiamide | 2.0 |
| Dextrine | 1.0 |
| Water | 4.5 |
| Total | 105.5 |

The bars were prepared from 400 grams of the mixture in a manner similar to that described in Example I with 200 grams in each bar using materials that were similar to those of Example IV. The density of one dried green bar was 2.26 grams/cc. The bars were fired at the same time and in the same enclosed silicon carbide sagger that the bars of Example IV were fired in.

The density of the fired bar was 2.35 grams/cc. and it was similar in structure and appearance to the bars of Example IV. The modulus of rupture at room temperature was 2940 p.s.i.

The unbroken bar was tested for resistance to molten cryolite and aluminum metal by the test described in Example I. After six two-hour cycles, the bar lost only 6% of the original volume. Comparison of the rate of attack curves for the specimen of this example and that of the standard oxide bonded composition shows that the bar described in Example V is much superior to the standard composition. (See Table I, Item #14.)

The bars of this example and of Example IV are very nearly the same, except that the bars of this example do not contain bentonite. Since the bar of this example behaved as well as the bars of Example IV in the corrosion test, it is concluded that bentonite is not required in this type of mixture.

Table I has given the results on silicon carbide refractory products of my new invention compared with old art oxide bonded products when tested by the molten cryolite-aluminum bath test. Attack occurs in the test all over the outside of a 4½" x 1" x 1" bar, although the attack tends to be slightly more in the cryolite layer just above the level of the molten aluminum. The presence of the aluminum appears to increase the rate of attack compared to tests that were run in a bath of cryolite only without any aluminum layer.

With the invention products, the outside zone near the surface, which in some instances may not contain much of any nitride, are corroded faster in the test and the inside portions are attacked only very slowly. Examination after test of a brick such as Item #9, Table I, cut across the center of a 9" x 4½" x 2½" straight brick to give two cut faces 4½" x 2½", shows a zone on the outside that by X-ray spectrographic analysis is shown to include the compound having peaks at d.=4.67 and d.=4.44, which zone appears roughened but none the less is far more resistant to the molten cryolite-aluminum test than cut sections of conventional oxide-bonded brick. Conventional oxide-bonded brick shows higher corrosion rates in the center of the sections than in the outer layer, and the rates for all portions of such prior art products are far higher, like that for the old art Fisher patent product of Item #17 which the table shows to give several orders of magnitude poorer results than the test invention product of Item #9, when tested on the same type of brick section by the same test method.

The Table I results are representative of a large number of additional tests that have been run on many more samples. The comparative test on Item #15 old art product is about the best obtained on any of the comparative old art standard products from various manufacturers and sources.

The amounts of powdered silicon present in what may be called the permanent commercial ingredients of my mixtures actually tested to date, have ranged from about 5% to about 12% by weight, but from 3% to 16% are considered to be usable under proper conditions of mixture formulation, structure of product, size and shape of article, setting and firing conditions, etc. Commercial calcium cyanamide ingredient amounts from ½% to 5% by weight are shown in Table I as having made successful products, and from 0.2% to 7% are considered usable with the commercial composition I have employed. Purer materials, especially material of low lime content, would be usable in larger amounts.

Table II summarizes X-ray results and shows that no $Si_3N_4$ was found in the small bars, only the compound having peaks at d.=4.67 and d.=4.44. In the core portion of a 9" brick, $Si_3N_4$ was present with only a trace of the compound having peaks at d.=4.67 and d.=4.44, whereas in the outer portion nearer the surface of the same brick there was only a trace of $Si_3N_4$, and the compound having peaks at d.=4.67 and d.=4.44 was present. The full section of the brick which included both core and outer portions confirmed these findings in that both $Si_3N_4$ and the compound having peaks at d.=4.67 and d.=4.44 were found present. Neither $Si_3N_4$ nor the compound having peaks at d.=4.67 and d.=4.44 were found in the bar of X-ray #6 which was for a bar made from a mixture exactly like Example II and contained silicon, but which differed from Example II in that there was no nitrogenous material present in the batch. In the absence of nitrogenous compound containing nitrogen available for nitriding the silicon at elevated temperatures, no X-ray lines were formed for nitrogen-containing compounds in the product.

*Table II*

$Si_3N_4$ and the compound having peaks at d.=4.67 and d.=4.44 measured by X-ray data.

| X-ray No. | Item description | Sample type | $Si_3N_4$ | Silicon nitride compound believed to be $Si_2ON_2$ |
|---|---|---|---|---|
| 1 | Like #9 in Table I; outer portion. | Brick 9"x4½"x 4½" x 2½". | Trace? | Present. |
| 2 | Like #9 in Table I; core portion. | Brick. | Present. | Trace?. |
| 3 | Like #9 in Table I; full section. | ----do---- | ----do---- | Present. |
| 4 | Like #3 in Table I; full section. | 4½" x 1" x 1" Bar. | None. | Do. |
| 5 | Like Ex. II in Table I; full section. | ----do---- | ----do---- | Do. |
| 6 | No nitrogenous material in mixture; otherwise like Ex. II, Table I; full section. | 4½" bar. | ----do---- | None. |

EXAMPLE VI

In some of my early work I prepared a refractory body from the following mixture:

(1)

The following ingredients were mixed dry:

| | Parts by wt. |
|---|---|
| Minus 10 mesh silicon carbide | 87.5 |
| Minus 325 mesh elemental silicon | 7.5 |
| Pulverized calcium cyanamide | 5.0 |
| Bentonite | 2.0 |
| Dextrine | 1.0 |

(2)

| | |
|---|---|
| Water added | 4.5 |

Two hundred and two grams of this mixture was put into a steel mold and pressed into a bar measuring 4.5" x 1" x 1¼" with three tons per square inch. The green density was 2.34 grams/cc.

The bar was fired in air in a kiln heated by silicon carbide heating elements to a temperature of 1400° C. The fired density was 2.41 grams/cc. The fired bar had a smooth glazed surface with a bluish gray sheen with some white glassy patches. The interior of the bar, seen by breaking the bar in half, showed a core extending to within ¼" from the surface with whitish gray development.

A portion of the interior of the bar when analyzed on a Norelco X-ray spectrometer operated at 30 kv. and 10 ma. showed a trace of $Si_3N_4$ and two peaks at d.=4.67 and d.=4.44 were observed. It is suspected that these two peaks are associated with a compound formed in the SiC, Si, $O_2$, $N_2$ system and I believe that this is a form of silicon oxynitride.

EXAMPLE VII

A brick 9 x 4½ x 2½" was prepared from the following composition:

| | Parts by wt. |
|---|---|
| Silicon carbide | 91.0 |
| Elemental silicon | 8.0 |
| Pulverized calcium cyanamide | 1.0 |
| 4% methyl cellulose solution | 4.0 |
| | 104.0 |

The inorganic ingredients were the same as those described in Example I.

The brick of this example was made along with other bricks in a manner similar to that described for the slab in Example III. The fired brick had a density of 2.64 g./cc. The surface of the brick was unglazed. The modulus of rupture values of bricks taken from the same lot averaged 5900 p.s.i. Corrosion test results on this brick showed a loss in weight of only 0.9% by volume after three 20-hour cycles.

A quarter of the brick was crushed and a representative sample was ground to a powder and analyzed by X-ray analysis and by quantitative chemical analysis. The X-ray pattern for this powder showed the following crystalline phases: silicon carbide, silicon oxynitride, $\alpha$ silicon nitride, and $\beta$ silicon nitride. The patern also indicates that there is more silicon oxynitride than silicon nitride in the product. The chemical analysis gave the following values:

| | Percent |
|---|---|
| Silicon | 67.51 |
| Combined carbon | 26.17 |
| Free carbon | .51 |
| Iron | .29 |
| Aluminum | .22 |
| Calcium | .40 |
| Nitrogen | 3.26 |
| Oxygen (by difference) | 1.64 |
| Total | 100.00 |

From the analyses of the raw materials used for this product and before any pick-up of oxygen or nitrogen during the firing of the brick and after free and combined waters are removed, the loss-free composition contains 0.65% oxygen (in the silicon carbide and calcium cyanamide as oxide impurities) and 0.22% nitrogen (in the cyanamide). A weight gain of 4.24% (1.06% oxygen and 3.18% nitrogen) of the loss-free weight gives 3.26% nitrogen and 1.64% oxygen in the product.

Analysis of the product shows that it contains .51% of free carbon. If it is assumed that the combined carbon is present as silicon carbide, and X-ray analysis shows only this carbon compound, then of the 67.51% silicon in the product 61.14% is combined with carbon and the remaining 6.37% is not. The value of silicon not with silicon carbide is determined by subtracting the result of multiplying the percent of combined carbon by the ratio of the atomic weight of silicon to the atomic weight of carbon from the total percent of silicon, or $$67.51 - 26.17 \times 28.06/12.01 \text{ equals } 6.28.$$

(28.06/12.01 equals 2.34.) This 6.28% silicon is thus available to combine with oxygen or nitrogen. In the product of this example, the weight ratio of available silicon to nitrogen is 1.93.

EXAMPLE VIII

Another lot of bricks 9 x 4½ x 2½" were prepared in the same manner and from the same composition as those in Example VII, but at a different time. The properties of a brick from this lot were:

PROPERTIES

| | |
|---|---|
| Fired bulk density | 2.58 g./cc. |
| Appearance | Unglazed. |
| Modulus of rupture | 6840 p.s.i. |
| Phases present by X-ray analysis | Silicon carbide, silicon oxynitride, and silicon. |
| Corrosion test results | 0.5% lost after six 2-hour cycles. |

A complete chemical analysis was also made on a representative sample of the brick with the following results:

| | Percent |
|---|---|
| Silicon | 69.80 |
| Combined carbon | 26.73 |
| Free carbon | .20 |
| Iron | .41 |
| Aluminum | .23 |
| Calcium | .41 |
| Nitrogen | 1.05 |
| Oxygen (by difference) | 1.17 |
| Total | 100.00 |

This analysis indicates a weight gain in firing of 1.38% (.84% nitrogen plus .54% oxygen) of the loss-free weight. The available silicon in this product is $69.80 - 2.34 \times 26.73$ which equals 7.25 weight percent of the product. In the product of this example, the weight ratio of available silicon to nitrogen is 6.90.

All of the X-ray patterns made on powder ground from product of this invention show a substantial amount of a compound with X-ray peaks at d.=4.44 and 4.67. Present information indicates that this compound is probably silicon oxynitride with the chemical formula $Si_2ON_2$. This compound contains 56% silicon, 16% oxygen, and 28% nitrogen, and the ratio of silicon to nitrogen is 2. Examples VII and VIII show that good product can be made over a range of available silicon to nitrogen ratios. Chemical analyses of product indicate that good product can be made according to this invention when the range of available silicon to nitrogen is between 1.8 and 10.

The bond composition varies considerably from Example VII to Example VIII. In product of Example VII, the X-ray pattern shows silicon oxynitride and silicon nitrides, and in product of Example VIII there is silicon oxynitride and silicon. The distinguishing feature of this product since both have good properties is that each has a substantial amount of the silicon oxynitride bond.

I have found that a nitrogen containing compound in the raw batch is necessary to produce my product. From Table II it was seen that neither silicon nitride nor the compound I believe to be silicon oxynitride formed when such a compound was absent. This nitrogen containing compound should be one which decomposes at elevated temperature to make nitrogen available for reaction with the free silicon. The compounds which I have found that will meet this requirement are the cyanamide group of compounds. Examples of such cyanamide compounds are: calcium cyanamide, dicyandiamide, cyanamide, cyanuramide (also known as melamine), sodium cyanamide, and lead cyanamide. These compounds decompose at elevated temperature to supply nitrogen to react with the free silicon, and reducing agents to combine with any of the oxygen that might diffuse into the product from the kiln atmosphere.

The decomposition of these cyanamides takes place at various temperatures and with various rates of reaction. Compounds such as dicyandiamide decompose at a somewhat lower temperature than calcium cyanamide. Although control of the atmosphere in which product is being fired is not required, the rate of heating is influential. I find that the timing of the heating cycle is not critical and indeed a product of very high quality has been produced by plunging a cold unfired shape directly into a preheated furnace. On the other hand, product of my invention of excellent quality has been made from a raw batch containing calcium cyanamide by firing the product by moving it at a typical rate of feed through a conventional fuel fired tunnel kiln.

It will thus be seen that there has been provided by this invention complex bonded silicon carbide compositions in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense. While one composition and firing procedure may be preferred for some uses and another composition and firing procedure may be selected for a different use, for purposes of complying with the statute, I select Example III as the best mode of practicing my invention although, for best performance in the molten cryolite-aluminum test bath, I select Item #9 in Table I with a bond weight ratio of commercial silicon to commercial calcium cyanamide of 8:1.

The above description includes typical examples of the best manner of performing my invention. It is conceivable that many modifications thereof may occur to those skilled in the art which will fall within the scope of the following claims.

I claim:

1. A solid rigid granular silicon carbide article wherein the granules are bonded with silicon oxynitride, said bond of the article having an X-ray diffraction pattern having peaks at d. 4.44 A. and 4.67 A.

2. A solid rigid article according to claim 1 having the weight ratio of $$\frac{(\text{silicon}-2.34 \times \text{combined carbon})}{\text{nitrogen}}$$

between 1.8 and 10.

3. A solid rigid article according to claim 2 in which the rigid body is temperature resistant to at least 1200° C.

4. A solid rigid article according to claim 3 having a density not less than 2.35 g./cc.

5. A solid rigid article according to claim 1 containing about .1 to 3.5% calcium.

6. A process for the manufacture of a rigid refractory body from granular silicon carbide wherein the granules are bonded with a silicon nitride compound comprising mixing granular silicon carbide, finely divided silicon and a finely divided cyanamide compound, forming the mixture into a shape, and firing the shaped mixture at a temperature as low as about 1200° C. in an oxidizing atmosphere containing nitrogen and oxygen, the source of said nitrogen and oxygen in said atmosphere being selected from the group consisting of air and combustion gases and mixtures thereof, said firing producing reactions to form said silicon nitride compound which bonds the silicon carbide granules of the body, the said silicon nitride bonding compound constituting the principal bond for the silicon carbide granules of said body.

7. A process according to claim 6 wherein the cyanamide compound is calcium cyanamide.

8. A process according to claim 6 wherein the cyanamide compound is dicyandiamide.

9. A process according to claim 6 wherein the rate at which the mixture is heated to said reaction temperature controls the proportion of silicon nitride to silicon oxynitride in the said bond.

10. A process according to claim 6 wherein the mixture is subjected to high pressure before firing and is then fired in a tunnel kiln.

11. A process according to claim 6 wherein the mixture is subjected to high pressure before firing and is then subjected to a plunge firing cycle.

12. A process according to claim 7 wherein said reaction bonding product has an X-ray pattern having peaks at d.=4.44 A. and 4.67 A. ascribed to silicon oxynitride and the said rigid refractory body has the weight ratio of $$\frac{(\text{silicon}-2.34 \times \text{combined carbon})}{\text{nitrogen}}$$

between 1.8 and 10.

13. A process according to claim 6 wherein the firing takes place at a temperature of 1400° C.

References Cited by the Examiner

UNITED STATES PATENTS

| | | | |
|---|---|---|---|
| 1,415,280 | 5/22 | Von Bichowsky | 23—191 |
| 2,524,739 | 10/50 | Stone | 23—157 |
| 2,618,565 | 11/52 | Nicholson | 106—44 |
| 2,752,258 | 6/58 | Swentzel | 106—44 |
| 2,846,324 | 8/54 | Satterfield | 106—44 |
| 2,948,034 | 8/60 | Schneider | 106—38.9 |
| 2,968,530 | 1/61 | Forgeng et al. | 23—203 |

FOREIGN PATENTS

| | | |
|---|---|---|
| 875,749 | 12/58 | Great Britain. |
| 1,156,707 | 12/57 | France. |

TOBIAS E. LEVOW, *Primary Examiner.*

JOHN H. MACK, JOSEPH REBOLD, *Examiners.*